United States Patent [19]

Bechstein et al.

[11] Patent Number: 5,784,161
[45] Date of Patent: Jul. 21, 1998

[54] HETERODYNE INTERFEROMETER ARRANGEMENT WITH TUNABLE LASERS, A HETERODYNE INTERFEROMETER, A COMPARISON INTERFEROMETER AND A REFERENCE INTERFEROMETER

[75] Inventors: Karl-Heinz Bechstein; Beate Moeller, both of Jena; Klaus Dieter Salewski, Greifswald; Andreas Wolfram, Karlsburg, all of Germany

[73] Assignee: Carl Zeiss Jena GmbH, Jena, Germany

[21] Appl. No.: 668,263

[22] Filed: Jun. 20, 1996

[30] Foreign Application Priority Data

Jun. 20, 1995 [DE] Germany ................. 195 22 262.8

[51] Int. Cl.⁶ .................................................. G01B 9/02
[52] U.S. Cl. .......................... 356/349; 356/358; 356/361
[58] Field of Search .............................. 356/361, 358, 356/351, 349

[56] References Cited

U.S. PATENT DOCUMENTS

| 4,907,886 | 3/1990 | Dandliker | 356/349 |
| 4,912,530 | 3/1990 | Bessho | 356/349 |
| 5,146,284 | 9/1992 | Tabaralli et al. | 356/361 |

Primary Examiner—Samuel A. Turner

[57] ABSTRACT

The present invention is directed to a heterodyne interferometer arrangement with tunable laser light sources for absolute distance measurement. The phase angle changes which occur in the synthetic interference signals when varying the laser frequencies are recorded and evaluated. The arrangement also enables error-free distance measurement in the event of a change in the mathematical sign of the phase changes due to frequency jitter.

7 Claims, 1 Drawing Sheet

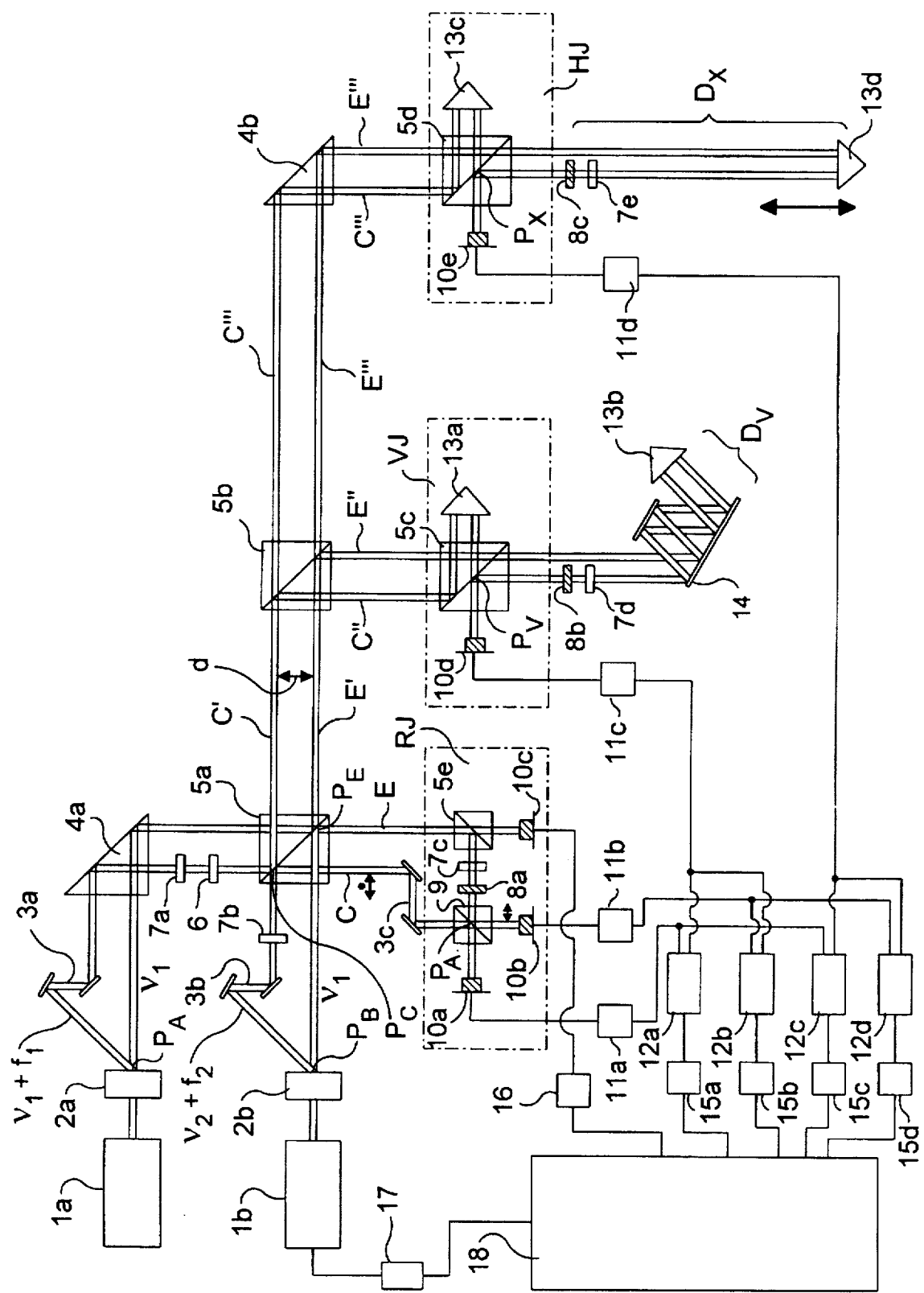

HETERODYNE INTERFEROMETER ARRANGEMENT WITH TUNABLE LASERS, A HETERODYNE INTERFEROMETER, A COMPARISON INTERFEROMETER AND A REFERENCE INTERFEROMETER

BACKGROUND OF THE INVENTION a) Field of the Invention

The invention is directed to a heterodyne interferometer arrangement (HIA) with tunable lasers for absolute distance measurement. This HIA has two lasers or one laser light source with two beam components of different frequency which allow the optical beat frequency that can be generated between the two beams to be varied. Also provided are acousto-optical modulators (AOM), which shift the frequency of the laser beams, and heterodyne interferometers (HI) whose periodic output signals, which are generated by electronic mixing, undergo phase angle changes depending on a variation of the beat frequency, these changes in phase angle being proportional to the optical path length realized within the respective interferometer.

b) Description of the Related Art

Among others, methods based on a variable synthetic wavelength or on the optical beat frequency $\Delta v$ corresponding thereto have proven advantageous for absolute distance interferometry. For this purpose, periodic signals whose phase angles depend upon the heterodyne wavelength or synthetic wavelength generated between two lasers rather than upon the small laser wavelength are produced by electric multipliers by means of HI's working on the basis of AOM's. A change in (tuning of) the synthetic wavelength causes a change in the phase angle of the synthetic heterodyne signal, wherein the velocity of the phase angle change of the path difference (reflector distance) of the interferometer and the tuning velocity is proportional. If the reflector distance is to be determined in this way, the frequency spacing of the lasers must be varied in a defined and reproducible manner.

It is known from classical interferometers that knowledge of the wavelength is not required if a second interferometer with a constant path difference is provided at the same time, as is described in DE 35 28 259 Al.

The arrangement according to DE 41 39 839 Al with two single-mode lasers, one of which can be varied with respect to wavelength, does not make use of the changes in the laser wavelength, but rather those in the substantially greater synthetic wavelength. Accordingly, vibrations and atmospheric refractive index fluctuations have only a slight effect on measurements.

The disadvantage in these arrangements consists in that a reversal in the direction of the phase change cannot always be determined in a non-monotonic tuning process, so that the total phase change is generally incorrectly determined.

The process and the device according to U.S. Pat. No. 4,907,886 also have this disadvantage in a heterodyne interferometer. A further disadvantage in this interferometer consists in that all partial beams are first united collinearly and are separated by optical polarization in a Michelson interferometer. Beam guidance of this kind can result in incomplete separation of the beam components in imperfect polarizing splitter layers and can lead to crosstalk.

Further, all of these known arrangements lack suitable devices for detecting the frequency equality of the two lasers during the tuning process. The low-frequency heterodyning resulting in this case likewise has a disruptive effect on the measurement signal.

The HIA's mentioned above only enable an absolute distance measurement which is free from errors in the ideal case of strictly monotonic tuning. The laser frequency and accordingly the synthetic wavelength always change in one direction. In the event of a change of the mathematical sign of the phase angle changes in the interferometer signals, the total phase change can no longer be determined in an error-free manner.

OBJECT AND SUMMARY OF THE INVENTION

The primary object of the present invention is to provide a heterodyne interferometer arrangement which also enables absolute distance measurement when the tuning behavior of the laser light sources is not ideal and which minimizes all erratic influences caused by beam guidance and signal detection.

According to the invention, this object is met in an HIA with tunable lasers for absolute distance measurement with high accuracy wherein a first beam splitter is provided which combines the frequency-shifted laser beams and the laser beams whose frequency remains unchanged at different locations on a splitter surface thereof and which is optically connected with the comparison interferometer and the heterodyne interferometer via a deflecting element. Frequency-shifted laser beams exit the first beam splitter and the laser beams, whose frequency is not shifted, exiting the first beam splitter are guided collinearly to the downstream comparison interferometer and heterodyne interferometer so as to be spatially separated from one another. A reference interferometer is included having two beam splitters and elements having an optical polarizing effect and photodetectors are arranged downstream of the first beam splitter. One of the two beam splitters are designed as a polarizing beam splitter to which is assigned two photodetectors. The photodetectors associated with the polarizing beam splitter are connected with a downstream computer serving as an evaluating unit via electronic multipliers and filters and mixing stages and filter stages and analog-digital converters. The photodetector with low-pass characteristics which is associated with the other of the two beam splitters is connected with the computer via a trigger signal generator.

The device comprises two single-mode lasers, at least one of which is tunable, and at least two AOM's which shift the frequency of the laser beams. The partial beams which are influenced by the action of the AOM's are united collinearly in pairs in a beam splitter which is arranged downstream of the AOM. An optical path difference which is defined with respect to two orthogonal polarization planes is realized in the partial beams in that a combination of quarter-wave plates and half-wave plates and additional half-wave plates is provided. A heterodyne interferometer (HI) in which the individual beam components are superposed so as to enable interference is arranged downstream of the beam splitter via additional optical elements. This HI advantageously comprises a polarization-invariant beam splitter, a combination of half-wave plates and polarizing filters, two retroreflectors, one of which is displaceable for distance measurement, and a photodetector. In a second HI which is likewise arranged downstream of the beam splitter, a constant comparison length which is realized by means of multiple reflections at mirrors is provided instead of the displaceable retroreflectors.

Further, a reference interferometer (RI) in which the partial beams are likewise superposed by simple optical means so as to enable interference is arranged downstream of the beam splitter. This RI comprises a polarizing splitter which separates the interference signals associated with the two orthogonal polarization planes and directs these signals to separate photodetectors. For this purpose, a special photodetector with low-pass characteristics is provided. This photodetector receives a portion of the light from one of the two collinearly guided beam pairs and, in the case of equality between the laser frequencies, generates a trigger pulse with the aid of electrical devices, e.g., low-pass filters, threshold switches, etc., which are arranged downstream, this trigger pulse being used to trigger the measurement value input after a suitable time delay.

Electronic multipliers, mixing stages and filter stages are provided which combine the output signals of the individual interferometers in a defined manner. The signals generated in this way are determined by the magnitude and the progression of the changes in the optical beat frequency and the magnitude of the optical path difference. Analog-to-digital converters which are arranged downstream are actuated according to a determined clock scheme and are connected with a computer which realizes the control of the measurement process and the digital processing of the stored measurement values.

After passing through the electric multipliers and filters, the known signals are given at the outputs of the HI's in the following form $$S \sim \cos(2\pi \Delta f \cdot t + \theta), \tag{1}$$

where $\Delta f$ represents the difference frequencies resulting between the two AOM's and $\theta$ is a phase angle which depends on the optical paths within the respective interferometer arrangement. Through the use of double-refracting materials (quarter-wave and half-wave plates), constant optical path differences are realized with respect to the two orthogonal polarization planes (•; ⇆) defined by them such that two phase-quadrature signals can be generated in principle for every interferometer. Two out-of-phase signals of the RI $$S_R \sim \cos(2\pi \Delta f \cdot t + \theta_R) \quad S_R \sim \sin(2\pi \Delta f \cdot t + \theta_R) \tag{2}$$

and one signal from each of the other interferometers HI and VI $$S_V \sim \cos(2\pi \Delta f \cdot t + \theta_V) \quad S_X \sim \cos(2\pi \Delta f \cdot t + \theta_X) \tag{3}$$

are suitably mixed in electric mixing stages (multiplicative mixing). After suppression of the higher-frequency signal components by means of low-pass filtering, the following signals are present at the mixing stages:

$$
\begin{aligned}
\vec{S_R} \cdot \vec{S_V} & \quad S^1_{RV} = \cos(\Delta\Theta_{RV}) \\
\overset{\leftrightarrow}{S_R} \cdot \vec{S_V} & \quad S^2_{RV} = \sin(\Delta\Theta_{RV}) \\
\vec{S_R} \cdot \vec{S_X} & \quad S^1_{RX} = \cos(\Delta\Theta_{RX}) \\
\overset{\leftrightarrow}{S_R} \cdot \vec{S_X} & \quad S^2_{RX} = \sin(\Delta\Theta_{RX}).
\end{aligned}
\tag{4}
$$

The phase angle differences $\Delta\Theta_{ij}$ depend only on the optical path difference of the interferometer arrangement and on the variable optical beat frequency.

Simple calculations give the following:

$$\Delta\Theta_{RV} = \frac{2\pi}{C} \{(L_{EV} - L_{CV} + L_{CR} - L_{ER})\Delta\overset{\circ}{\nu} + (L_{CR} - L_{CV})\Delta f\} \tag{5}$$

$$\Delta\Theta_{RX} = \frac{2\pi}{C} \{(L_{EX} - L_{CX} + L_{CR} - L_{ER})\Delta\overset{\circ}{\nu} + (L_{CR} - L_{CX})\Delta f\},$$

where $L_{EV}$ is the light path between points $P_E$ and $P_V$ of the interferometer arrangement, etc. (see drawing).

Accordingly, two signals are generated for every interferometer, these signals differing from one another by a constant phase angle, preferably 90°, and are therefore suitable also for unequivocally determining negative phase angle changes. Such negative phase angle changes can occur, e.g., when the monotonicity of the tuning process is disrupted due to frequency jitter. Absolute distance measurement can be carried out using a VI with a constant comparison path. The ratio of the total phase changes corresponds to the ratio of the unknown reflector distance and comparison path.

Assuming that the light path $L_{EX}$, for example, contains the reflector distance in question, the following equations can be defined with a suitable selection of the reference points of the distance measurement $$L_{EX} - L_{CX} + L_{CR} - L_{ER} = 2D_X \tag{6}$$

and $$L_{EV} - L_{CV} + L_{CR} - L_{ER} = 2D_V \tag{7}$$

for the VI, where $D_X$ represents the distance to be measured and $D_V$ represents a known constant comparison path.

If m and n are the multiples of $2\pi$ corresponding to the total phase angle changes, then $D_X/D_V = 2\pi \cdot m/2\pi \cdot n$, from which $D_X$ can easily be determined, and m and n are whole numbers. In order to achieve a high resolution of measurement values in distance measurement it is necessary to determine the phase fractions of $2\pi$ at the beginning and at the end of the tuning process. For this purpose, the signal waveforms must be recorded with a high sampling frequency especially in these regions. These requirements are met by a device which is realized, e.g., by means of A–D converters and digital storages.

It is also significant that a state in which $\Delta\nu$ lies in the vicinity of the AOM frequencies can occur when varying the optical beat frequency. This adversely affects the measurement signals in question. This influence is eliminated in that the signals are only recorded when the optical beat frequency is sufficiently high. For this purpose, it is necessary that the agreement of the two laser frequencies during the tuning process is determined, for example, by means of a photodetector with low-pass characteristics and that a trigger pulse then be generated electronically to trigger the measurement process after a suitable delay.

The invention will be explained more fully in the following with reference to an embodiment example.

BRIEF DESCRIPTION OF THE DRAWINGS

The drawing shows the inventive arrangement in schematic representation.

DESCRIPTION OF THE PREFERRED
EMBODIMENTS

The heterodyne interferometer arrangement HIA, according to the invention, has two laser light sources 1a and 1b whose emitted radiation with the different optical frequencies $\nu_1$ and $\nu_2$ is directed to downstream acousto-optical modulators AOM 2a and 2b and split into partial beams, one of which is shifted in frequency. Thus, a diffracted partial beam $v_1+f_1$ and $v_1+f_2$ and a partial beam $v_1$ and $v_2$ which is not diffracted exit from the outputs $P_A$ and $P_B$ of the AOM's 2a and 2b, wherein the diffracted partial beams undergo defined frequency shifts. All of the partial beams exiting from the AOM's 2a and 2b are united by a beam splitter 5a at points $P_C$ and $P_E$ on its splitter surface 5at by means of downstream beam deflectors 3a; 3b and a deflecting prism 4a. Immediately prior to this first combining of the partial beams, two orthogonal polarization planes, designated by the symbols • and ⇆ in the drawing, are fixed in the respective partial beam by means of a quarter-wave plate (6). The polarization planes of the partial beams in question are rotated by means of two half-wave plates 7a and 7b which are arranged in the corresponding partial beams so that roughly the same beam output occurs on both of the differently polarized partial beams, and the optical paths $L•_{AC}$ and $L⇆_{AC}$ between points $P_A$ and $P_C$ which depend on the orientation of the polarization planes differ from one another by a quarter wave. The two partial beam pairs C and E formed at points $P_C$ and $P_E$ are superposed in the interferometer arranged downstream of the beam splitter 5a, in the reference interferometer RI, and in the interference point $P_R$ of the beam splitter 9 so as to enable interference. This beam splitter 9 has the additional function of separating the beam components penetrating it with reference to the two orthogonal polarization planes and makes it possible to record the corresponding interference signals separately by means of photodetectors 10a and 10b. The arrangement of a polarizing filter 8a in combination with a half-wave plate 7c in turn allows the detuning of the beam output components in the two interference channels so that the amplitudes of the signals generated by the photo detectors 10a and 10b have approximately equal values. These signals are fed to the nonlinear electronic component elements (multipliers) and filters 11a; 11b arranged downstream.

The heterodyne signals which are obtained by means of these multipliers and filters 11a and 11b and whose frequency corresponds to the difference frequency ($\Delta v=v_1-v_2$) of the AOM's are ideally in quadrature due to the different optical paths realized by the quarter-wave plate 6.

The HIA has two additional interferometers, a VI which realizes a constant optical comparison length and a HI which realizes the distance to be determined. The VI is acted upon by the two other partial beams C' and E' exiting the beam splitter 5a via an additional beam splitter 5b which is arranged downstream of the first beam splitter 5a. These partial beams C' and E' are split at the splitter film or splitter layer 5bt of the beam splitter 5b into partial beams C" and E" and C'" and E'", traversed different optical paths in the VI, they are combined at interference point $P_V$ on the splitter surface 5ct of the beam splitter 5c. In so doing, partial beam C" is guided, via a retroreflector 13a and partial beam E" is guided via a polarizing filter 8b, a half-wave plate 7d, a mirror arrangement 14 which extends the beam path, and an additional retroreflector 13b, to interference point $P_V$.

Due to the multiple reflections in the mirror arrangement 14, a relatively long optical path is realized for the respective partial beam E", which reduces the uncertainty in measurement. As a result of the polarizing filter 8b, only interference in one of the two polarization planes • or ⇆ described above is recorded, wherein interference signals which are detectable simultaneously in both polarization planes occur with a corresponding phase displacement in a manner analogous to RI. The half-wave plate 7d serves to optimize the beam output passing through the polarizing filter 8b. The signal generated by the photodetector 10d is given to the input of an electronic pre-processing stage 11c whose output is connected with the mixing and filter stages 12a and 12b.

A third interferometer, the heterodyne interferometer HI, to which the beam pairs C'" and E'" are guided via the deflecting prism 4b, has a construction analogous to that of the VI described above. But instead of the constant comparison length $D_V$ which is realized in the beam pair E'" by the mirror arrangement 14 a movable retroreflector 13d serves to measure the unknown distance $D_X$. The superposition of the beam pairs C'" and E'" for producing interference is effected at an interference point $P_X$ on the splitter surface 5dt of the beam splitter 5d. Again, by means of the combination of polarizing filter 8c and half-wave plate 7e, only a defined interference signal is detected within this HI by means of the photoreceiver 10e.

The heterodyne signals generated by the photoreceiver 10e are fed to the mixing and filter stages 12a; 12b; 12c; 12d whose output signals are detected by the A-D converters 15a; 15b; 15c and 15d and directed to a computer 18.

The digitized signal waveforms are read in by the computer 18 for further digital processing. This computer 18 also has the function of controlling the measurement process, i.e., triggering the tuning process for one of the two laser light sources (e.g., 1b) by means of a tuner 17.

In order to achieve the greatest possible total change in the optical beat frequency, both laser frequencies are first detuned such that beat frequency $\Delta v \approx 0$. At the start of the tuning process, because $\Delta v=0$, a low-frequency signal is recorded at the photodetector 10c, as a result of which a trigger pulse is generated by means of a suitable electronic device 16 (e.g., low-pass filter, threshold switch and monostable multivibrator). This trigger pulse can advantageously be used to initiate the recording of the measured value after a delay.

While the foregoing description and drawings represent the preferred embodiments of the present invention, it will be obvious to those skilled in the art that various changes and modifications may be made therein without departing from the true spirit and scope of the present invention.

What is claimed is:

1. A heterodyne interferometer arrangement for absolute distance measurement, comprising:

a laser source producing two original laser beams of different frequency;

acousto-optical modulators disposed in beam paths downstream of said laser source for producing two frequency-shifted laser beams from said original laser beams, respectively;

a first beam splitter disposed in beam paths downstream of said laser source and said acousto-optical modulators for combining said original laser beams at one location on a splitter surface and for combining said frequency-shifted laser beams at another location on said splitter surface;

a comparison interferometer having a constant comparison path, said comparison interferometer being disposed downstream of said first beam splitter;

a heterodyne interferometer with a fixed reference reflector and a measurement reflector displaceable within a measurement path, said heterodyne interferometer being disposed downstream of said first beam splitter;

optical elements including an optical deflecting element disposed between said first beam splitter on an upstream side and said comparison interferometer and said heterodyne interferometer on a downstream side for guiding the combined frequency-shifted laser beams and the combined original laser beams along collinear, spatially separate paths from said first beam splitter to said comparison interferometer and said heterodyne interferometer;

optical polarizing elements and half-wave plates disposed in beam paths of said comparison interferometer and said heterodyne interferometer;

photodetectors optically linked to said comparison interferometer and said heterodyne interterometer for generating electrical interferometer signals;

a computer operatively connected to said photodetectors for processing said interferometer signals and obtaining path information;

a reference interferometer disposed downstream of said first beam splitter, said reference interferometer including a second beam splitter, a polarizing beam splitter, an optical polarizing component, and two photodetectors, said second beam splitter and said optical polarizing component being disposed upstream of said polarizing beam splitter, said two photodetectors being optically coupled on an upstream side to said polarizing beam splitter and electrically coupled on a downstream side to said computer, said reference interferometer including an additional photodetector with low-pass characteristics optically coupled to said second beam splitter; and electrical components including multipliers, filters, mixing and filtering stages and analog-to-digital converters connected between said two photodetectors and said computer, said electrical components further including a trigger signal generator connected between said additional photodetector and said computer.

2. The heterodyne interferometer arrangement according to claim 1, further comprising a quarter-wave plate and a half-wave plate disposed in one beam path between said acousto-optical modulators and said first beam splitter for operating on one of said frequency-shifted laser beams, also comprising a half-wave plate disposed in another beam path between said acousto-optical modulators and said first beam splitter for operating on the other of said frequency-shifted laser beams, so that, when laser light is distributed in two orthogonal polarization planes, one of said frequency-shifted laser beams has a constant optical path difference of a quarter wave and the other of said frequency-shifted laser beams has a path difference of zero in both polarization planes.

3. The heterodyne interferometer arrangement according to claim 1 wherein said combined frequency-shifted laser beams are parallel to said combined original laser beams.

4. The heterodyne interferometer arrangement according to claim 1 wherein said comparison interferometer, said heterodyne interferometer and said reference interferometer have beam splitters with interference points wherein said combined frequency-shifted laser beams are superposed with said combined original laser beams to thereby generate heterodyne signals detectable by respective ones of the photodetectors.

5. The heterodyne interferometer arrangement according to claim 4 wherein said heterodyne signals include signals which occur in the orthogonal polarization planes and which are separable in each of said comparison interferometer, said heterodyne interferometer and said reference interferometer by polarizing elements taken from the group consisting of filters and splitters disposed downstream of the interference points.

6. The heterodyne interferometer arrangement according to claim 4 wherein said heterodyne signals include signals which occur in the orthogonal polarization planes and which are separable in each of said comparison interferometer, said heterodyne interferometer and said reference interferometer by polarizing filters.

7. The heterodyne interferometer arrangement according to claim 1 wherein said laser source comprises two lasers each generating one of said laser beams.

* * * * *